Dec. 21, 1937.  C. W. COLLIER  2,102,612
METHOD AND APPARATUS FOR MAKING MAPS
Filed Dec. 10, 1935   2 Sheets-Sheet 1

INVENTOR
CHARLES W. COLLIER
BY
ATTORNEY.

Dec. 21, 1937.   C. W. COLLIER   2,102,612
METHOD AND APPARATUS FOR MAKING MAPS
Filed Dec. 10, 1935   2 Sheets-Sheet 2
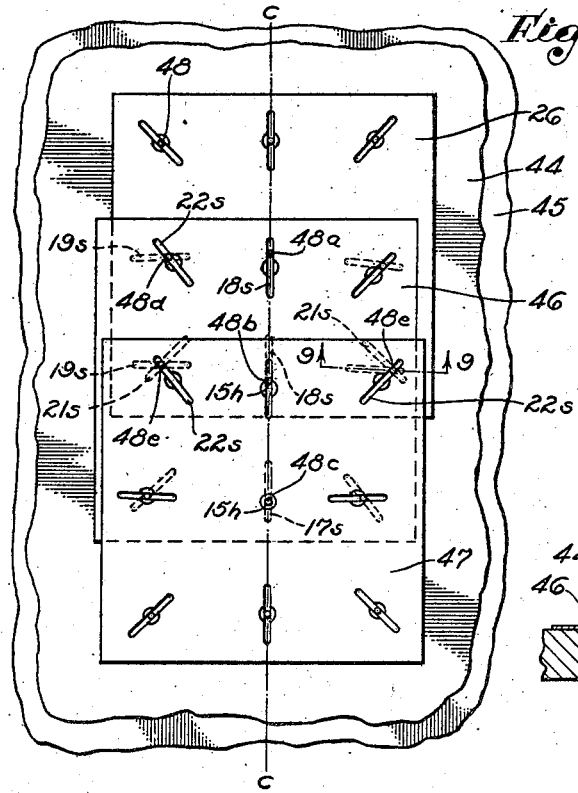
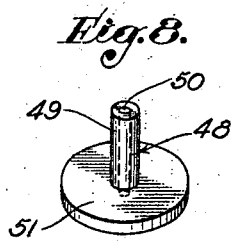
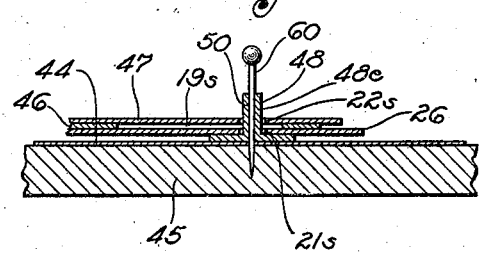
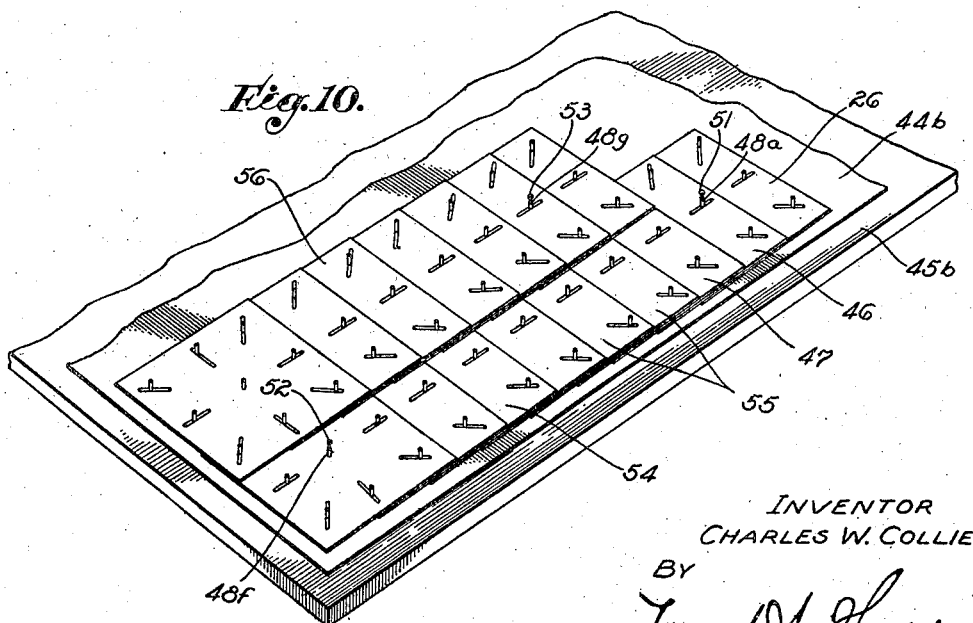
INVENTOR
CHARLES W. COLLIER
BY
Ford M. Harris
ATTORNEY.

Patented Dec. 21, 1937

2,102,612

UNITED STATES PATENT OFFICE 2,102,612

METHOD AND APPARATUS FOR MAKING MAPS

Charles W. Collier, Alexandria, Va., assignor to Fairchild, Polley & Eliel, Inc., Los Angeles, Calif., a corporation of California Application December 10, 1935, Serial No. 53,791

14 Claims. (Cl. 33—1)

My invention relates to cartography and relates in particular to a method and apparatus for the assembling or production of mosaic maps and line maps from aerial photographs.

My present invention constitutes an improvement over the method of making maps from aerial photographs generally known as the radial line method, the "Bagley method", the "Arundel method", radial triangulation, etc. The general principles of the method on or over which the invention is an improvement are well known to the art, and accordingly the general method above referred to will be mentioned or described herein only as it becomes necessary to refer to the same for the purpose of explaining my differences, improvements, and advantages over the existing art.

It is an object of the present invention to provide a method and apparatus for making maps from aerial photographs, in which the need for elaborate instruments, such as radial triangulators, is avoided, wherein the large amount of control established by field survey in the conventional graphical method of aerial map making and the consequent cost thereof are avoided, wherein the tedious labor and cumulative errors as in the mathematical method of aerial map making are reduced to a comparatively small value, and in which the work may in the most part be performed by relatively unskilled operators as compared with the large amount of skill required in the known methods of aerial map formation or assembly.

It is an object of the invention to provide a method for the assembling of maps from aerial photographs which is very simple and at the same time very rapid; which is less subject to cumulative errors than the known methods owing to the fact that large blocks or sections are laid out and adjusted simultaneously; which may be readily adapted to specified requirements and may be readily made to conform to the desired tolerances; and which is self-checking and therefore substantially fool-proof.

It is an object of the invention to provide templets which are representative of map areas, these templets being so formed as to be assembled in overlapping relation and to have cooperative means for holding them adjustably together in proper scale-relation so as to be simultaneously adjusted to established reference points on an assembly board.

It is a further object of the invention to provide a simple form of templet which constitutes a multi- or variable-scale representation of a map area. Herein the term "map area" designates an area of the ground or terrain, or any photograph or picture thereof.

It is a further object of the invention to provide a templet representative of a map area, in which the characteristic angles of the map area are represented by mechanical guide means forming a part of the templet. In the preferred practice of the invention the characteristic angles are defined by slots which radiate from the central point of the templet in centralized relation to the outlying points of the map area of which the templet is a representation.

It is a further object of the invention to provide a templet of the above character and adjustable means for holding these templets together with the radial lines thereof in proper cooperative relation and in such a manner that an adjusting relative movement of two connected templets will automatically produce a proportionate movement of the other templets connected thereto.

It is a further object of the invention to provide a method and means for forming slots in a templet of the above character in centralized relation to the outlying points and in radial relation to the principal center point.

Further objects and advantages of the invention will be brought out in the following part of the specification.

Referring to the drawings, which are for illustrative purposes only,

Fig. 7 is a view showing a number of templets placed on a mounting board.

Fig. 8 is a perspective view of a conjoining post forming a part of the invention.

Fig. 9 is an enlarged fragmentary sectional view taken as indicated by the line 9—9 of Fig. 7, this view showing the manner in which points established by the positions of the conjoining post are transferred to a reference paper and to the mounting board.

Fig. 10 is a fragmentary perspective view showing a mounting board with reference pins.

Figure 1:
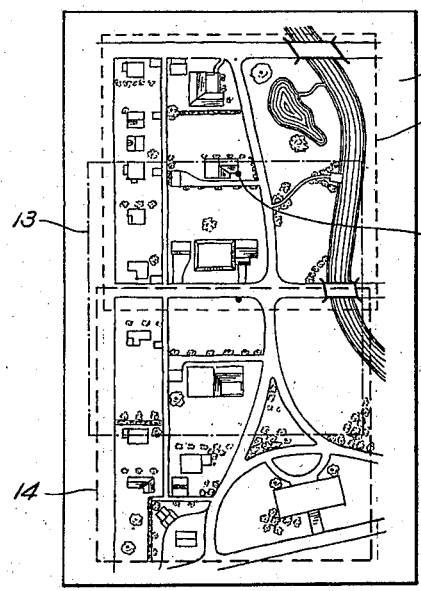
Fig. 1 is a fragmentary view of a section of a town of which a map is to be made.

In Fig. 1 a view 11, looking downwardly on a portion of a town, is shown, this view or area 11 being representative of any area of ground from which a map is to be made by aerial photography. In the accepted practice for making aerial maps, an airplane carrying a camera is flown back and forth along adjacent parallel lines over the area to be photographed, and consecutive photographs are taken in overlapping relation. The overlap of the pictures taken along a line of flight is greater than one-half the width of the picture, preferably fifty-five or sixty per cent overlap. Accordingly, in Fig. 1 I have, by dotted lines, outlined overlapping square areas 12, 13, and 14 of which it may be assumed that photographs have been taken.

Figure 2:
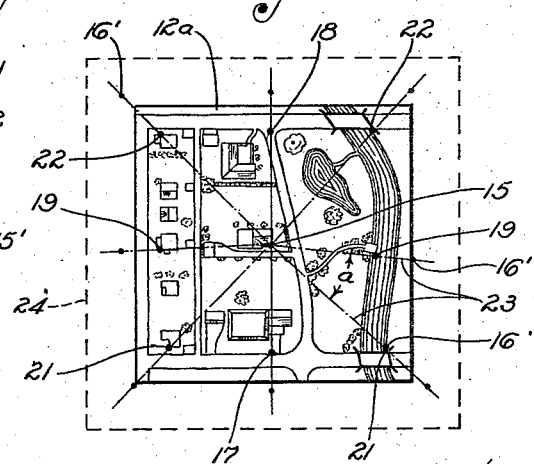
Fig. 2 represents an aerial photograph of a portion of Fig. 1.

In Fig. 2 I show a photograph 12a of the area 12 of Fig. 1. The picture shown on this photograph 12a I have chosen to call a map area, since it constitutes an area of a map and is namely a copy of the map area 12 of Fig. 1. Likewise, it may be stated that the photograph 12a is a map area representative of the area 12 of Fig. 1 regardless of the scale of the photograph. In other words, the photograph 12a may be enlarged or reduced, but it will still continue to be the same map area. This should be clearly understood from the following explanation.

Around the principal center point, or actual center point 15 of the photograph 12a, which center point may be established by the lens of the camera, eight outlying center points 16 are marked on the photograph 12a at clearly recognizable points of the picture presented by the photograph 12a. These outlying points 16 are preferably pricked on the photograph by means of a prick punch. Two of the points 16 are disposed to the front and to the rear of the principal center point 15 and may be respectively termed the "forward secondary center point" and the "rearward secondary center point" as respectively indicated at 17 and 18. On opposite sides of the principal center point 15 lateral wing points 19 are located, and on opposite sides of the forward secondary center point 17 forward wing points 21 are located. Likewise, on opposite sides of the rearward secondary center point 18 wing points 22 are located.

If radial lines 23 are passed through each of the outlying points 16 and the principal center point 15, these radial lines will define central angles a. Should the photograph 12a be now placed in an enlarging camera, the lens of which is centralized with the principal center point 15, and an enlargement of the photograph 12a made, such as indicated by dotted lines 24, every eccentric point or part around the principal center point 15 of the picture presented by the photograph 12a will move radially outwardly. For example, the outlying points 16 will all move to the positions or points 16'. The central angles a will remain unchanged, and the outlying points 16' of the enlargement 24 will continue to define these central angles a for the reason that they continue on the radial lines 23. Accordingly, the central angles a and the positions of the radial lines 23 around the principal centerpoint 15 are a characteristic of the map area represented by the photograph 12a, the enlargement 24 thereof, or any other enlargement or reduction thereof, and the central angles a and the radial lines 23 are a characteristic of any photograph of the area 12 of Fig. 1 having its center point coinciding with the center point 15' of the area 12.

Figure 3:
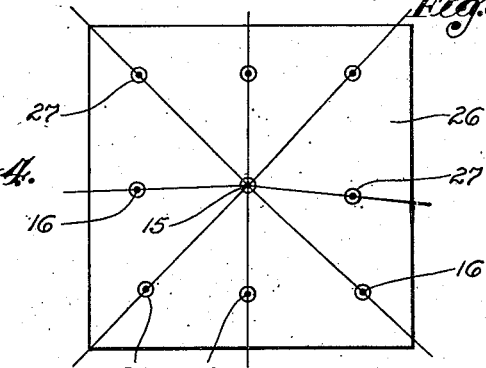
Fig. 3 represents a sheet from which a templet is to be made, this sheet having a principal center point and outlying points thereon taken from the photograph of Fig. 2.
Figure 4:
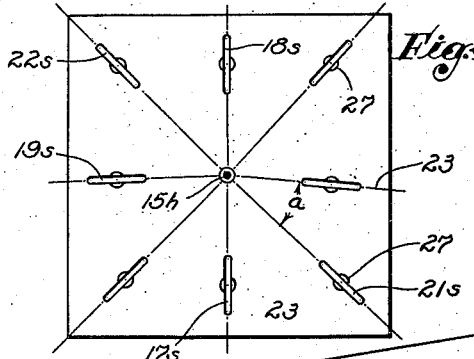
Fig. 4 is a view showing the templet after it has been slotted.

As shown in Fig. 3, a templet 26, preferably a piece of transparent Celluloid, is inscribed with the points 15 and 16 corresponding in position to these points on the photograph 12a. This may be readily accomplished by placing the templet 26 over the photograph and by use of a prick punch pricking the points 15 and 16 in the surface of the templet 26. To definitely establish the positions of these points on the templet 26, small circles 27 are drawn around the same. As shown in Fig. 4, a small center hole 15h is punched concentric with the point 15 appearing on the templet 26, as shown in Fig. 3. Then, central slots 17s and 18s, lateral slots 19s, forward wing slots 21s, and rearward wing slots 22s are respectively punched in positions extending radially with respect to the central hole 15h and concentric with the respective points 17, 18, 19, 21, and 22 shown in Fig. 3. The slots have a width corresponding to the diameter of the opening 15h, and since the positions of these slots are determined by the positions of the outlying points 16, they establish the same radial lines 23 and central angles a as those appearing on the photograph or map area 12a. Since I have stated that the central angles a, and likewise the positions of the radial lines 23 of the photograph 12a, constitute a characteristic or characteristics of the map area represented by the photograph 12a, it may be said that the central hole 15h and the radial slots 17s, 18s, 19s, 21s, and 22s of the templet in Fig. 4 are representative of the characteristics of the map area; or, in other words, the templet shown in Fig. 4 may be said to be representative of the map area presented by the photograph 12a or any centralized enlargement or reduction thereof, for the reason that if the templet 26 is now placed over the photograph 12a with the opening 15h concentric with the principal center point 15, each of the outlying points 17, 18, 19, 21, and 22 will lie on the center line passing through the corresponding slots 17s, 18s, 19s, 21s, and 22s. Likewise, this condition will be found present when the templet 26 of Fig. 4 is placed upon an enlargement or a reduction in the same manner. In addition, it may be said that the templet 26 of Fig. 4 is representative of the map area 12 of Fig. 1 or any centralized photographic or other true image thereof regardless of the scale thereof. Owing to the change in altitude of the airplane taking a series of consecutive photographs over an area from which a map is to be made, the same scale will not be preserved in all of the photographs. The templet, of the character shown in Fig. 4, made from the various photographs, is of composite or multiple scale, since its prescribed limitations are the central angles a defining the positions of the radial lines 23. Accordingly, these multiple scale templets, when assembled on the mounting board to establish the positions for the subsequent placing of photographs, compensate for the differences in scale of the photographs which have been taken from an airplane.

Figure 5:
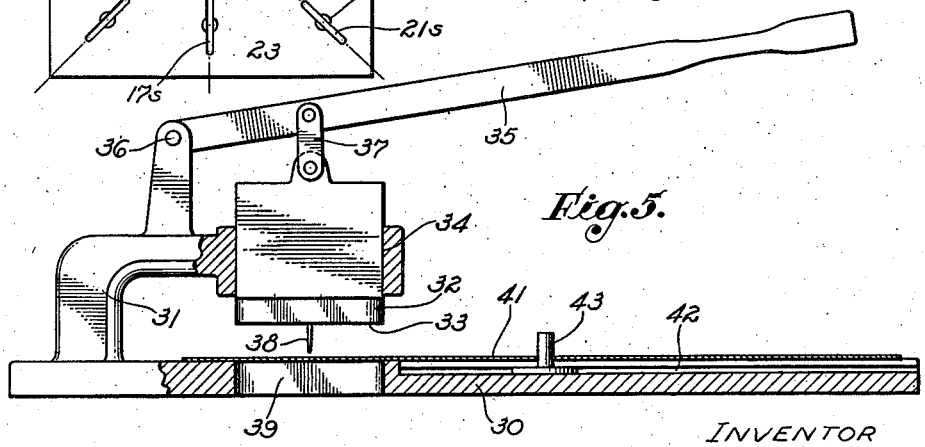
Fig. 5 is a partly sectioned elevational view showing the device for slotting the templet, with a templet thereon in position for slotting.
Figure 6:
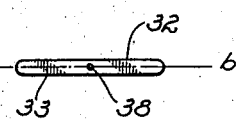
Fig. 6 is a bottom plan view of the punch or cutter employed in the device shown in Fig. 5.

In Fig. 5 I show a simple form of the device for forming the slots in the templets. This device has a flat table 30 provided with a support 31 for a slotting cutter or punch 32 having its lower or cutting face 33 elongated along an axis b—b as shown in Fig. 6. By guide walls 34, Fig. 5, the punch 32 is guided so that it may move vertically, and actuating means are provided in the form of a handle 35 which is pivoted at 36 and is connected to the upper end of the punch 32 by means of a link 37. The punch 32 has a centralizing pin 38 projecting downwardly from the center of the face 33 thereof, and the lower portion of the punch 32 is adapted to pass into a die or opening 39 formed in the base 30 so that a slot will be punched in a templet placed on the base 30, as indicated by the numeral 41. The base 30 has guide means in the form of a slot 42 in the upper face thereof aligned with the axis b—b of the cutter 32. In this slot a post 43 is slidably carried so that it may be moved to and from the cutter 32.

In the operation of slotting a templet, the templet is placed with the center hole 15h thereof over the post 43, and the templet and post 43 are then moved until an outlying point 16 is concentric with the lower end or point of the pin 38. The handle 35 is actuated downwardly to force the punch 32 through the templet, thereby forming a slot therein, which slot will be centralized relative to the outlying point 16 and will likewise be radially directed with respect to the center opening 15h.

In Fig. 7 I show the templet 26 placed upon a sheet of paper 44 which is secured to a mounting board 45 to constitute a control surface. In overlapping relation I also show templets 46 and 47 placed on the sheet of paper 44, these templets 46 and 47 being representative of the map areas 13 and 14 of Fig. 1 and having been prepared from photographs taken of the areas 13 and 14, in the manner described relative to Figs. 2, 3, and 4. The templets 26, 46, and 47 are connected together by means of conjoining posts 48, each of which, as shown in Fig. 8, comprises a stem 49 having a diameter corresponding to the diameter of the hole 15h of each of the templets and to the width dimension of the slots which are formed in the templets. Each conjoining post 48 also has a face or flange 51 projecting radially from the lower end of the stem 48. A guide opening 50 is extended vertically through each post 48, as shown in Figs. 8 and 9. Each post, indicated at 48a, 48b, or 48c, passes through the center opening 15h of a templet 26, 46, or 47 respectively, and each of the pins or posts 48a, 48b, and 48c passes also either a forward slot 17s, a rearward slot 18s, or both, of an adjoining templet or templets. For example, the post 48a passes through the rearward slot 18s of the templet 46, the post 48b passes through the forward slot 17s of the templet 26, then upwardly through the central opening 15h of the templet 46, and finally through the rearward slot 18s of the templet 47. The post 48c passes upwardly through the forward slot 17s of the templet 46 and then through the central opening 15h of the templet 47. A post 48 is projected upwardly through each lateral wing slot 19s of each templet 26, 46, and 47. Such a post, as indicated at 48d in Fig. 7, will pass through a lateral wing slot 19s and also through a rearward wing slot 22s, the slots 19s and 22s being respectively in the templets 26 and 46. The post indicated specifically as 48e passes through the forward wing slot 21s of the templet 26 through the lateral wing slot 19s of the templet 46, and through the rearward wing slot 22s of the templet 47. It will be understood that the row of templets started by the three templets 26, 46, and 47, of Fig. 7, may be continued by the placing of consecutive templets in overlapping relation, and it will be further understood that wherever three templets overlap, as upon the line 9—9 of Fig. 7 or as shown in Fig. 9, a post 48 will pass through the three overlapping portions of such templets, and the position of the post will indicate the point of intersection of the center lines of the crossing slots through which the post 48 projects.

Should any two of the templets shown in Fig. 7 be moved relatively together or apart along the line c—c of Fig. 7, the remaining templet must be proportionately moved, and likewise the posts 48 indicated specifically as 48a, 48b, and 48c will be moved proportionately. For example, should the templets 26 and 47 be moved relatively apart, the change in the position of the slots 21s and 22s through which the post indicated at 48e is projected will cause movement of the post 48e laterally outwardly in proportion to the movement of the templets 26 and 47.

In assembling a group of templets on a mounting board, it is customary to locate several reference points upon the mounting board, the positions of which are determined by ground survey. For example, I have shown in Fig. 10 reference pins 52 and 53 driven into a mounting board 45b on which a reference paper 44b is placed, the pins 52 and 53 passing through the paper 44b and forming small holes therein indicating their positions. The pins 51, 52, and 53 are spaced apart in accordance with the desired scale to which the map is to be assembled. A strip 54 of templets 26, 46, 47, and additional templets 55, is assembled upon the reference paper 44b. The post 48a is placed over the pin 51, and then the strip 54 of templets is either lengthened or shortened, as requirements may be, to bring the post 48f into such position that it will surround the pin 52 which represents the proper position for this post 48f. In the elongating or shortening of the strip 54, the cooperative action of the posts, center holes, and slots causes a proportionate movement of all of the posts so that the positions of the posts will indicate the outlying points and center points of the connected templets to the scale established by the reference pins 51 and 52, all within the tolerance established by the fit of the posts in the openings and slots of the templets.

There may be three rows of posts interconnecting the templets of a strip as shown in Fig. 7, but only two rows, the center row and one of the outside rows, are necessary to interlock the templets of a strip. In fact, in Fig. 7 the only essential posts are 48a, 48b, 48c and either one of the two posts 48e. If there is a post through the central aperture of each templet of a strip and a post of the outside row through each combination of three overlapping templets, the strip will be interlocked and may be extended or contracted in a coordinated manner. When the strip is so extended or contracted, cam action on the part of the slots causes the posts to move away from or towards each other proportionately. If any given post is selected as a reference point for movement of the other posts, it will be found that all the other posts, or slot intersections where there are no posts will move radially with respect to the given post. It will be apparent, then, that the advantage of slots over mere lines on the templets is first in the fact that means such as the posts may engage the slots to interlock the templets, and, second, that the slots not so engaged will intersect to provide indicating apertures through which reference points may be plotted directly onto the mounting board.

A second strip of templets, as indicated at 56, may be assembled and placed along the side of the strip 54 in overlapping relation to the edge of the strip 54 as shown, and the proper post indicated at 48g is caused to reside upon the pin 53. The assembly of the templets upon the mounting board 45b may be continued by the formation of adjacent strips and the placing of the same in overlapping relation to the previously adjusted strip of templets. Additional reference pins are placed on the mounting board as conditions may require.

If there has been an error in the marking of a point, such as an outlying point 16, on a photograph, or if there has been an error in the punching of a central opening 15h or a radial slot in a templet, the templet prepared from the erroneously marked photograph or which has been improperly punched will not lie in flat condition when conjoined with the remaining templets by use of posts 48. This condition provides an automatic check on the accuracy of the templets and makes it possible to quickly correct one or more templets, as may be required, and greatly speeds up the preparation of a mounting board so that photographs constituting separate map areas may be secured thereto in properly related positions.

After the desired assembly of templets is made upon the paper 44b, pins such as the marking pin 60 shown in Fig. 9 are passed through openings 50 in selected posts 48, and are driven through the paper 44b into the board 45b, thereby marking in the paper and in the board the positions of the points represented by the posts 48. The number of pins used is somewhat at the discretion of the map maker, but ordinarily each center point of the templet must be marked upon the paper 44b and the board 45b, together with a suitable number of outlying points so that the positions of the templets will be definitely marked upon the mounting board 45b and the paper 44b which is to be subsequently used for the purpose of correcting the sizes of the photographs from which the templets have been prepared, so that such photographs may be secured in properly spaced relation on the mounting board 45b.

It is customary to number the photographs in consecutive order and to correspondingly number the templets which are prepared therefrom. On the reference paper 44b and the mounting board 45b the marked center points are likewise numbered. The photographs are then checked against the dimensions established by the points marked upon the reference paper, and enlargements and reductions are then made thereof as required, so that the final photographs which are to be mounted upon the mounting board 45b will have their center points and outlying points disposed so as to match the points which have been defined on the mounting board 45b by the pins 60. This correction of the photographs is accomplished by measuring the distances between several points on each photograph and comparing the same with the measurements of distances between the corresponding points which have been marked on the reference paper 44b by the passage of pins 60 therethrough. The proper size of the final photograph in each instance is then computed, and from the original photographic negative final photographs to a mean scale are prepared by use of an enlarging and reducing printer or camera. The final photographs are then trimmed and mounted upon the mounting board 45b in the positions indicated by the penetration of the points of the pins 60 into the surface of the mounting board 45b.

In the construction of line maps or planimetric maps, the same procedure in locating and recording the positions of the center points and outlying points is followed as in the construction of mosaic maps.

Previously herein I have indicated the diameters of the posts 48, the holes 15h, and the slots 17s, 18s, etc., as corresponding. By this I do not mean that these dimensions shall be exactly the same but that they shall have a correspondence within the limits of the working conditions selected or the tolerances adopted. Accordingly, the variations may be at times relatively large.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A templet representative of a map area and its central angles, said templet having mechanical guide means operative along the radial lines defining said central angles, said guide means having the function of connecting a second similar templet to said templet so that said radial lines of said templets will intersect at points spaced apart proportionately to the spacing of corresponding points on said map area.

2. A templet representative of a map area having radial slots therein defining the central angles of said map area, and conjoining means adapted to be passed through said slots to adjustably connect said templet to adjoining templets of similar character.

3. A templet representative of a map area, said templet having a central perforation defining the main center point of said map area and radial slots defining the central angles of said map area with respect to selected reference points of the map area, whereby the templet may be mechanically connected with other templets having similar slots related to said reference points.

4. A templet representative of a map area, said templet having a central perforation defining the main center point of said map area and radial slots defining the central angles of said map area, and posts adapted to be passed through said central opening and said slots of said templet to connect the same to a templet of similar character.

5. A templet representative of a map area, said templet having a central perforation defining the main center point of said map area and radial slots defining the central angles of said map area, and posts adapted to be passed through said central opening and said slots of said templet to connect the same to a templet of similar character, said posts having means for holding them substantially perpendicular to the plane of said templets.

6. In map making means of the character described, a templet having slots representative of the central angles of a map area, in combination with a post comprising a stem adapted to pass through a slot in said templet, and a flange forming a base for said stem.

7. A templet representative of a map area having outlying points defining central angles, said templet having mechanical guide means defining said central angles, and conjoining means operative between certain of said guide means to adjustably connect said templet to adjoining templets of similar character, said conjoining means being movable along said guide means.

8. A templet representative of a map area having outlying points defining central angles, said templet having mechanical guide means defining said central angles, and conjoining means operative between certain of said guide means to adjustably connect said templet to adjoining templets of similar character, said conjoining means being movable along said guide means, said conjoining means also engaging said mechanical guide means so as to have a small lateral movement.

9. A templet representative of a map area having radial slots therein defining the central angles of said map area, and conjoining means adapted to be passed through said slots to adjustably connect said templet to adjoining templets of similar character, said conjoining means being movable lengthwise of said slots so as to occupy positions indicating the points of intersection of crossing slots and also having a small lateral movement relative to said slots.

10. A templet representative of a map area, said templet having means defining the center point of the area and mechanical means defining central angles interrelating outlying reference points of the area whereby the templet may be interlocked with other templets having similar mechanical means related to said reference points.

11. A method of the character described for locating points for map purposes, including the steps of: taking a series of photographs of consecutive overlapping areas including basic reference points for which map data are known; forming templets representative of said photographs, each templet having a hole representing the center point of the corresponding photograph and having slots radial to the hole representing angular relationships among outlying reference points of the photograph, said outlying points including said basic reference points; plotting said basic reference points on a control surface at locations spaced in accordance with a desired scale; assembling said templets on said control surface in the sequence of the corresponding photographs; interconnecting said templets by a plurality of means representing said reference points and extending through the center holes and at least some intersecting slots of overlapping templets, thereby interlocking the templets for coordinated extension or contraction; and adjusting said series of templets to cause the interconnecting means at slot intersections that correspond with said ploted basic reference points on the control surface to register with said plotted points, thereby placing on the control surface the remaining interconnecting means and slot intersections at positions with respect to said basic reference points corresponding to said desired scale.

12. A method of the character described for locating points for map purposes, including the steps of: taking a series of photographs of consecutive overlapping areas including basic reference points for which map data are known; forming templets representative of said photographs, each templet having a hole representing the center points of the corresponding photograph and having slots radial to the hole representing angular relationships among outlying reference points of the photograph, said outlying points including said basic reference points; plotting said basic reference points on a control surface at locations spaced in accordance with a desired scale; assembling said templets on said control surface in the sequence of the corresponding photographs; interconnecting said templets by a plurality of connecting members adapted to slide on the control surface and to extend through overlapping templets in sliding engagement with intersecting slots thereof, said members representing reference points corresponding to the slots, thereby interlocking the templets for coordinated extension or contraction on the control surface; and adjusting said series of templets to cause the connecting members that correspond with said plotted basic reference points on the control surface to register therewith, thereby moving on the control surface the remaining connecting members and slot intersections to positions with respect to said basic reference points corresponding to said desired scale.

13. A method of the character described for producing a photographic map, including the steps of: taking a series of photographs of consecutive overlapping areas including basic reference points for which map data are known; forming templets representative of said photographs, each templet having a hole representing the center point of the corresponding photograph and having slots radial to the hole representing angular relationships among outlying reference points of the photograph, said outlying points including said basic reference points; plotting said basic reference points on a control surface at locations spaced in accordance with a desired scale; assembling said templets on said control surface in the sequence of the corresponding photographs; interconnecting said templets by a plurality of means representing said reference points and extending through the center holes and at least some intersecting slots of overlapping templets, thereby interlocking the templets for coordinated extension or contraction; adjusting said series of templets to cause the interconnecting means that correspond with said plotted basic reference points on the control surface to register therewith, thereby placing on the control surface the remaining interconnecting means and slot intersections at positions with respect to said basic reference points corresponding to said desired scale; substituting for the templets at their adjusted locations the corresponding photographs; and correcting by enlargement or reduction any photograph that does not show its outlying reference points spaced in accordance with the corresponding interconnecting means and slot intersections.

14. A method of the character described for producing a photographic map, including the steps of: taking a series of photographs of consecutive overlapping areas including basic reference points for which map data are known; forming templets representative of said photographs, each templet having a hole representing the center point of the corresponding photograph and having slots radial to the hole representing angular relationships among outlying reference points of the photograph, said outlying points including said basic reference points; plotting said basic reference points on a control surface at locations spaced in accordance with a desired scale; assembling said templets on said control surface in the sequence of the corresponding photographs; interconnecting said templets by a plurality of connecting members adapted to slide on the control surface and to extend through overlapping templets in sliding engagement with intersecting slots thereof, said members representing reference points corresponding to the slots, thereby interconnecting the templets for coordinated extension or contraction on the control surface; adjusting said series of templets to cause the connecting members that correspond with said plotted basic reference points to register therewith, thereby moving on the control surface the remaining connecting members and slot intersections to positions with respect to said basic reference points corresponding to said desired scale; substituting for the templets at their adjusted locations the corresponding photographs; and correcting by enlargement or reduction any photograph that does not show its outlying reference points spaced in accordance with the corresponding interconnecting means and slot intersections.

CHARLES W. COLLIER.